(12) United States Patent
Poojary et al.

(10) Patent No.: US 8,135,676 B1
(45) Date of Patent: Mar. 13, 2012

(54) METHOD AND SYSTEM FOR MANAGING DATA IN STORAGE SYSTEMS

(75) Inventors: Sathisha Poojary, Bangalore (IN); Ravindra Kumar, Bangalore (IN)

(73) Assignee: Netapp, Inc., Sunnyvale, CA (US)

( * ) Notice: Subject to any disclaimer, the term of this patent is extended or adjusted under 35 U.S.C. 154(b) by 455 days.

(21) Appl. No.: 12/111,053

(22) Filed: Apr. 28, 2008

(51) Int. Cl.
*G06F 17/30* (2006.01)

(52) U.S. Cl. ............... 707/646; 707/649; 707/653

(58) Field of Classification Search .......... 707/640, 707/672, 642, 641, 643, 644, 648, 647, 649, 707/646, 653; 711/162
See application file for complete search history.

(56) References Cited

U.S. PATENT DOCUMENTS

| | | | |
|---|---|---|---|
| 6,189,016 B1 * | 2/2001 | Cabrera et al. ................... | 1/1 |
| 6,675,177 B1 * | 1/2004 | Webb ................................. | 1/1 |
| 7,158,991 B2 * | 1/2007 | Kekre et al. ....................... | 1/1 |
| 7,266,655 B1 * | 9/2007 | Escabi et al. ................. | 711/162 |
| 7,284,104 B1 * | 10/2007 | Wu et al. ....................... | 711/162 |
| 7,617,262 B2 * | 11/2009 | Prahlad et al. ..................... | 1/1 |
| 2003/0158831 A1 * | 8/2003 | Zaremba ........................... | 707/1 |
| 2003/0182322 A1 * | 9/2003 | Manley et al. ................. | 707/201 |
| 2005/0071379 A1 * | 3/2005 | Kekre et al. ................... | 707/200 |
| 2005/0203908 A1 * | 9/2005 | Lam et al. ........................ | 707/10 |
| 2006/0106893 A1 * | 5/2006 | Daniels et al. ................ | 707/204 |
| 2007/0005915 A1 * | 1/2007 | Thompson et al. ........... | 711/162 |
| 2007/0006017 A1 * | 1/2007 | Thompson et al. ............... | 714/6 |
| 2007/0185939 A1 * | 8/2007 | Prahland et al. ............. | 707/204 |
| 2007/0204120 A1 * | 8/2007 | Garimella et al. ............ | 711/162 |
| 2007/0214197 A1 * | 9/2007 | Bolik et al. ................... | 707/204 |
| 2009/0319585 A1 * | 12/2009 | Gokhale ....................... | 707/205 |

* cited by examiner

*Primary Examiner* — Sherief Badawi
(74) *Attorney, Agent, or Firm* — Klein, O'Neill & Singh, LLP

(57) ABSTRACT

Method and system for incremental backup of data containers with fixed length records is provided. Initially, a backup application copies all stored data containers to create an initial backup container. A data structure corresponding to the first backup operation is also created. The data structure maintains unique file identifiers for each data container and information regarding when a record was added. The data structure is created and maintained by an application that also creates, updates, and modifies the fixed length records. The application updates the base data structure when records are added to a data container, after the initial backup. For a next backup operation, the initial data structure is compared to an updated data structure that is current at the next backup time. The comparison identifies the new records that were added (or updated) since the initial backup operation. The backup application then incrementally copies the new records.

18 Claims, 4 Drawing Sheets

Flat File
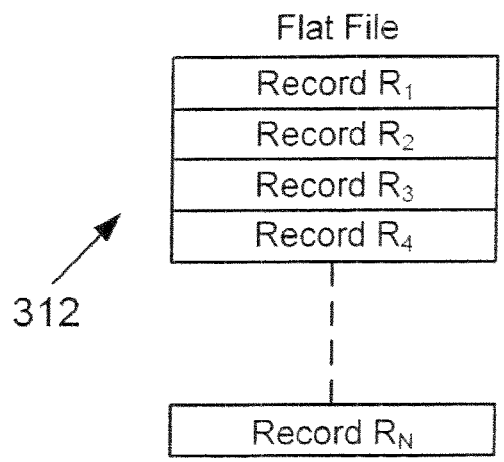
FIG. 3B
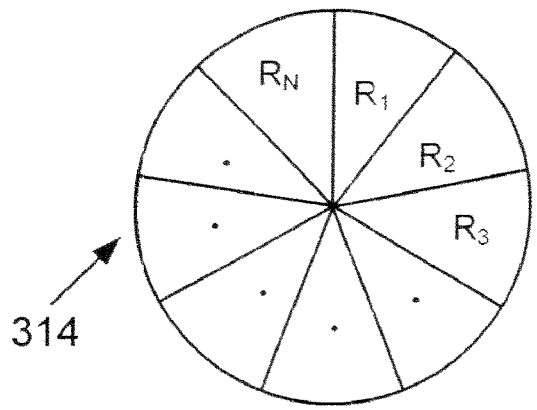
FIG. 3C
| File Identifier 316 | Offset Value 318 |
|---|---|
| File 1 | |
| File 2 | |
| . | |
| . | |
| . | |
| File N | |
FIG. 3D

METHOD AND SYSTEM FOR MANAGING DATA IN STORAGE SYSTEMS

1. TECHNICAL FIELD

The present disclosure relates to storage systems.

2. RELATED ART

Information stored at storage devices is routinely backed up (or copied) from a first storage device (may also be referred to as a primary storage device) to a second storage device (may also be referred to as secondary storage device). One reason for backing up stored information is to ensure redundancy, if the primary storage device fails.

Different data types may be stored in storage devices as data files. For example, certain data files may include fixed length records that may be frequently added or changed. Incremental back up of fixed length records that are added or changed continues to be a challenge for conventional systems because data files are typically backed up on a block by block basis. In conventional systems, to determine which block may have changed at any given time, one first generates a hash function for each stored and changed block and then the generated hash functions are compared. Generating and comparing hash functions at individual block level consumes computing resources and hence, is undesirable.

Continuous efforts are being made to streamline backup of stored information.

SUMMARY

In one embodiment, a method and system for incremental backup of stored data containers is provided. The stored data containers may include flat files, circular flat files, and other types of files with fixed record length (interchangeably referred to herein as "flat files"). A backup application during an initial backup operation copies all the stored data containers to create an initial backup data container. A data structure (for example, an index file) corresponding to the first backup operation is also created (may also be referred to as a "base data structure" (or "base index file")). The data structure is used to maintain unique file identifiers for each data container and information regarding when a record was added.

The data structure is created and maintained an application that also creates, updates, and modifies the fixed length records. The application updates the base data structure when records are added (or updated) for a data container, after the initial backup operation. Because the application understands record format and controls the record content it is efficient for the application to create and maintain the data structure.

For a next backup operation, the base data structure is compared to an updated data structure (for example, an updated index file) that is current at the next backup time. The comparison identifies the new records that were added (or updated) since the initial backup operation. The backup application then incrementally copies the new records instead of copying all the records, including the records that were previously copied during the initial backup operation.

The various embodiments disclosed herein provide advantageous solutions to incremental backup of files with fixed length records. The backup operation occurs without any disruption to any operating application. Because only changed records are copied, the backup files consume less storage space than if all the records are repeatedly backed up.

The solutions provided by the various embodiments are less complex than conventional block level backup techniques that generate and use complex hash functions to determine if data at a block level has changed. In the present embodiments, the application that creates records also maintains the data structure for new and updated records. Maintaining the data structure is less burdensome than generating complex hash functions and then comparing the hash functions to ascertain which records may have changed.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures:

FIG. 3B shows an example of a flat file backed up according to one embodiment;

FIG. 3C shows an example of a circular flat file backed up according to one embodiment;

FIG. 3D shows an example of an index file used for backing up data files, according to one embodiment;

DETAILED DESCRIPTION

Figure 1:
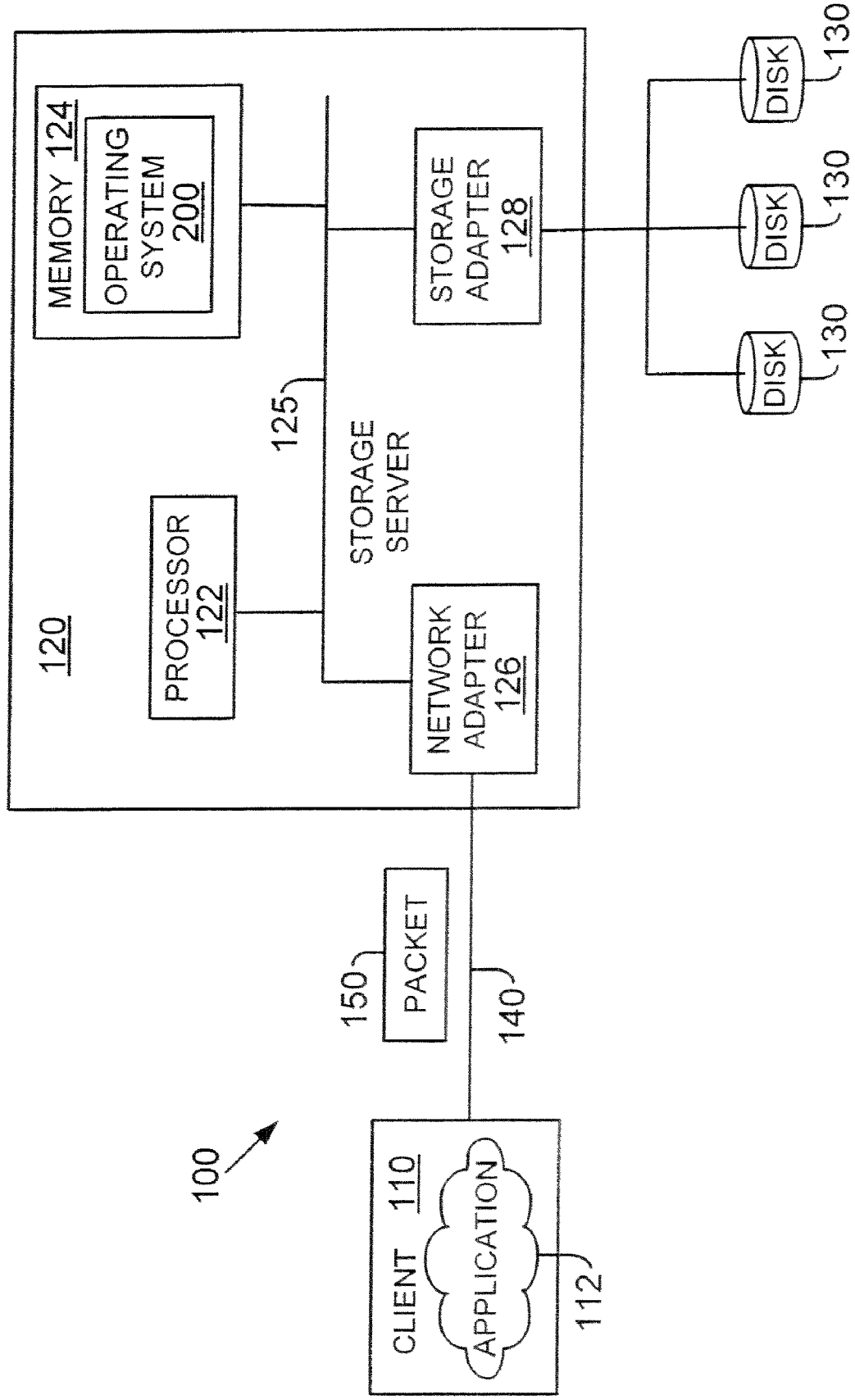
FIG. 1 shows a block diagram of a system using the methodology of the present disclosure.

The following definitions are provided as they are typically (but not exclusively) used in the computing/storage environment, implementing the various adaptive embodiments described herein.

"Backup" (or "backing up" or "back up") means copying stored information from one storage location to another storage location.

"Data Container" means a file, a logical unit or any other information. The term file is used interchangeably with data container, throughout this specification "Flat File" means a data container (or file) having a plurality of records, where each record is substantially the same size.

"Circular Flat File" means a flat file with a defined number of records, where each record is substantially the same size. The difference between a circular flat file and a flat file is that the circular file includes a defined number of records unlike a flat file that may have unlimited number of similar size records.

In one embodiment, a method and system for incremental backup of stored information is provided. The stored information may include flat files, circular flat files, and other types of files with fixed record length (interchangeably referred to as flat files). A backup application during an initial backup operation copies all the stored files to create an initial backup file. A data structure (may also be referred to as an index file)

corresponding to the first backup operation is also crated (may also be referred to as "base data structure" or "base index file"). The data structure maintains unique file identifiers for each file and information regarding when a record was added.

The data structure is created and maintained by the application that also creates, updates, and modifies the fixed length file records. The application updates the base data structure when records are added (or updated) to a file, after the initial backup operation. Because the application understands file record format and controls file content, it is efficient for the application to create and maintain the data structure.

For a next backup operation, the base data structure is compared to an updated data structure that is current at the next backup time. The comparison identifies the new records that were added (or updated) since the initial backup operation. The backup application then incrementally copies the new records instead of copying all the records, including the records that were previously copied during the initial backup operation.

To facilitate an understanding of the various embodiments of the present disclosure, the general architecture and operation of a networked storage system will first be described. The specific architecture and operation of the various embodiments will then be described with reference to the general architecture.

As used in this disclosure, the terms "component" "module", "system," and the like are intended to refer to computer-related entity, either software, hardware, a combination of hardware and software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

System:

FIG. 1 is a schematic block diagram of a system 100 including a network storage appliance that may be advantageously used with the various embodiments disclosed herein. The network storage appliance or storage server (may also be referred to as a storage system) 120 is a special-purpose computing system that provides file service relating to the organization of information on storage devices, for example, disks 130. However, it will be understood to those skilled in the art that the inventive embodiments described herein may apply to any type of special-purpose (e.g., server) or general-purpose computer, including a standalone computer.

It is noteworthy that the storage server, the processes and systems disclosed herein are not limited to processing file based requests. The adaptive embodiments disclosed herein can support block based storage requests, for example, Small Computer Systems Interface (SCSI) based requests.

Storage server 12 comprises a processor 22, a memory 124, a network adapter 126, and a storage adapter 128 interconnected by a bus 125. The storage server 120 also includes an operating system 200 that implements a file system to logically organize the information as a hierarchical structure of directories and files on disks 130.

In the illustrative embodiment, memory 124 may include storage locations that are addressable by processor 122 and adapters (126 and 128) for storing software program code and data structures associated with the embodiments of the present disclosure. The processor 122 and adapters (126 and 128) may, in turn, comprise processing elements and/or logic circuitry configured to execute the software code and manipulate the data structures.

The operating system 200, portions of which is typically resident in memory and executed by the processing elements, functionally organizes storage server 120 by, inter alia, invoking storage operations in support of file service implemented by storage server 120. It will be apparent to those skilled in the art that other processing and memory means, including various computer readable media, may be used for storing and executing instructions pertaining to the embodiments described herein.

Network adapter 126 comprises the mechanical, electrical and signaling circuitry needed to connect storage server 120 to a client 110 over a computer network 140, which may comprise a point-to-point connection or a shared medium, such as a local area network. The client may be a general-purpose computer configured to execute applications including file system protocols, such as the Common Internet File System IFS) protocol (or block based protocols (e.g. SCSI)). Moreover, the client 110, interact with the storage server 120 in accordance with a client/server model of information delivery. That is, the client may request the services of the storage server 120, and the storage server 120 may return the results of the services requested by the client, by exchanging packets 150 encapsulating, e.g., the CIFS protocol format (or a block based, SCSI format) over the network 140

Storage adapter 128 cooperates with operating system 200 to access information requested by a client application (112). The information may be stored in disks 130. The storage adapter 128 includes input/output (I/O) interface circuitry that couples to disks 130 over an I/O interconnect arrangement, such as a conventional high-performance, Fibre Channel serial link topology. The information is retrieved by storage adapter 128 and, if necessary, processed by processor 122 or the adapter 128 itself) prior to being forwarded over system bus 125 to network adapter 126, where the information is formatted into a packet and returned to client 110.

To facilitate access to disks 130, operating system 200 implements a file system that logically organizes the information as a hierarchical structure of directories and files on the disks. Each "on-disk" file may be implemented as set of disk blocks configured to store information, such as text, whereas a directory may be implemented as a specially formatted file in which other files and directories are stored. An example of operating system 200 is the Data ONTAP™ operating system available from NetApp, Inc. that implements a Write Anywhere File Layout (WAFL™) file system.

Figure 2:
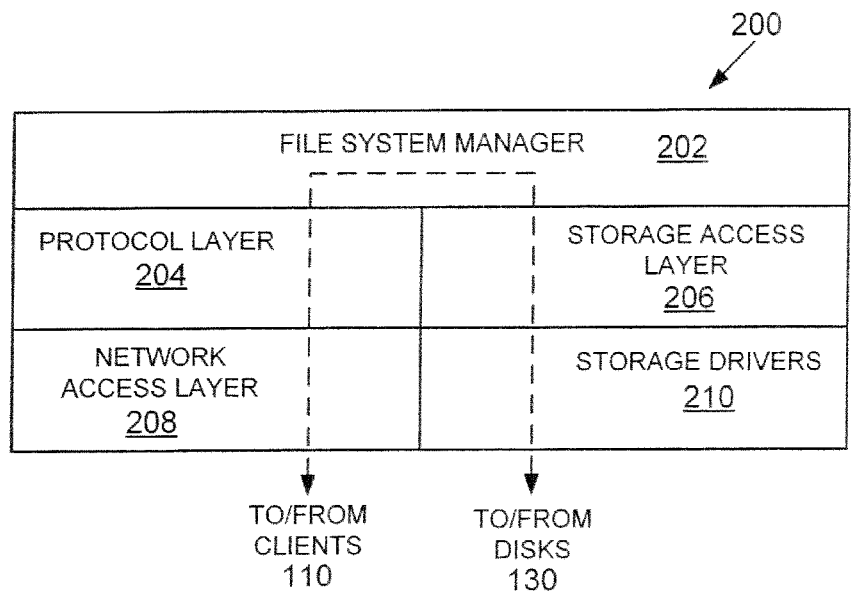
FIG. 2 shows an example of an operating system used by a storage server of FIG. 1.

Operating System Architecture:

FIG. 2 illustrates a generic example of operating system 200 for storage server 120, according to one embodiment of the present disclosure. In one example, operating system 200 may be installed on storage server 120. It is noteworthy that operating system 200 may be used in any desired environment and incorporates any one or more of the features described herein.

In one example, operating system 200 may include several modules, or "layers." These layers include a file system manager 202 that keeps track of a directory structure (hierarchy) of the data stored in a storage subsystem and manages read/write operations, i.e. executes read/write operations on disks in response to client 110 requests.

Operating system 200 may also include a protocol layer 204 and an associated network access layer 208, to allow storage server 120 to communicate over a network with other systems, such as clients 110. Protocol layer 204 may implement one or more of various higher-level network protocols, such as Network File System (NFS), Common Internet File System (CIFS), Hypertext Transfer Protocol (HTTP), Transmission Control Protocol/Internet Protocol (TCP/IP) and others.

Network access layer 208 may include one or more drivers, which implement one or more lower-level protocols to communicate over the network, such as Ethernet. Interactions between clients 110 and mass storage devices 130 (e.g. disks, etc.) are illustrated schematically as a path, which illustrates the flow of data through operating system 200.

The operating system 200 may also include a storage access layer 206 and an associated storage driver layer 210 to allow storage server 120 to communicate with a storage subsystem. The storage access layer 206 may implement a higher-level disk storage protocol, such as RAID (redundant array of inexpensive disks), while the storage driver layer 210 may implement a lower-level storage device access protocol, such as Fibre Channel Protocol (FCP) or SCSI. In one embodiment, the storage access layer 206 may implement a RAID protocol, such as RAID-4 or RAID-DP™ (RAID double parity for data protection provided by NetApp, Inc., the assignee of the present disclosure).

It should be noted that the software "path" through the operating system layers described above needed to perform data storage access for the client request received at the storage server may alternatively be implemented in hardware. That is, in an alternate embodiment of the disclosure, the storage access request data path may be implemented as logic circuitry embodied within a field programmable gate array (FPGA) or an application specific integrated circuit (ASIC). This type of hardware implementation increases the performance of the file service provided by storage server 120 in response to a file system request packet 150 issued by client 110. Moreover, in another alternate embodiment, the processing elements of network and storage adapters (126, 128) may be configured to offload some or all of the packet processing and storage access operations, respectively, from processor 122, to thereby increase the performance of the file service provided by the storage server.

In one embodiment, file system manager 202 includes a Write Anywhere File System (WAFL™) layer. The WAFL based file system is block-based, i.e. stores information on disks as blocks, for example, using, e.g., 4 kilobyte (KB) data blocks, and uses modes describe the files. An mode is a data structure, e.g., a 128-byte structure, which may be used to store information, such as meta-data, about a file. The meta-data may include data information, e.g., ownership of the file, access permission for the file, size of the file, file type and location of the file on disk, as described below. The WAFL layer uses a file handle, i.e., an identifier that includes an mode number, to retrieve an mode from a storage disk. The WAFL layer also uses files to store meta-data describing the layout its file system. These meta-data files include, among others, an mode file.

Figure 3A:
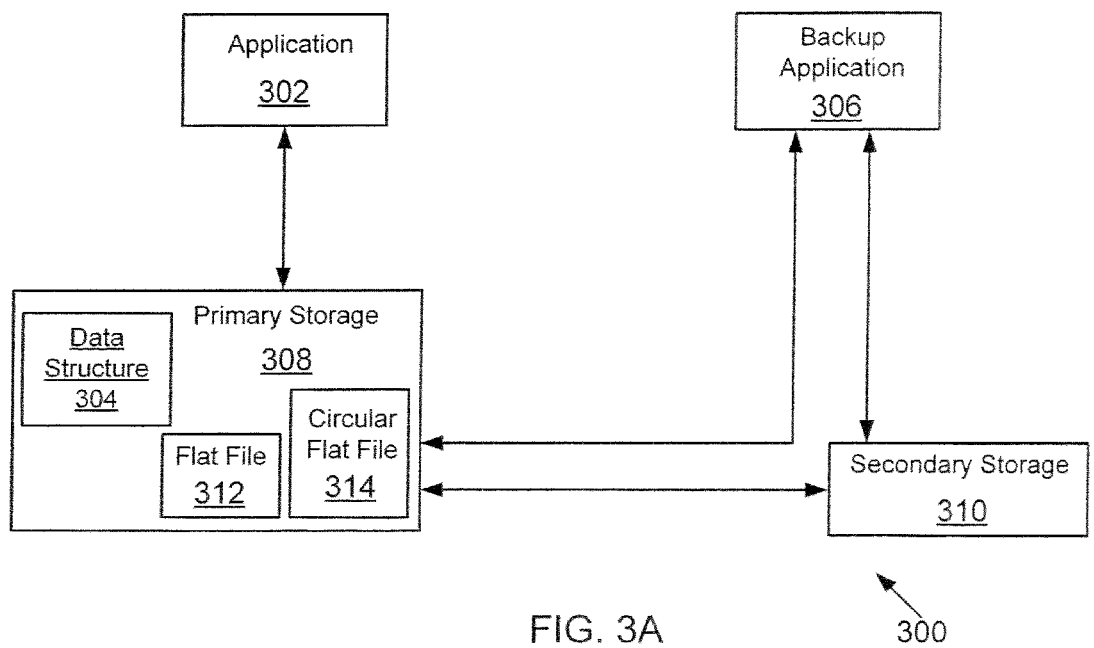
FIG. 3A shows an example of a system for backing up data files, according to one embodiment.

Backup System:

FIG. 3A shows a block diagram of a system 300 for backing up stored data from a primary storage device 308 to a secondary storage device 310. An application 302 (similar to application 112, FIG. 1) executed by a computing system (for example, client 110, FIG. 1) typically stores data in primary storage device 308, for example, flat files 312 and circular flat files 314. Based on user request and/or user need, backup application 306 copies data files from primary storage 308 to secondary storage 310. In one embodiment, backup application 306 may be executed by storage server 120 (FIG. 1). One skilled in the art can appreciate that the adaptive embodiments are not limited to any particular computing system executing application 302 and backup application 306.

Application 302 may perform numerous functions to meet user needs. The type of data files and records depend on the nature of application 302. For example, in one embodiment, application 302 may be the Performance Advisor™, a utility application provided by NetApp, Inc. that maintains storage device performance information in circular flat files 314. The performance information is stored as fixed length records and the records are added and changed frequently. The adaptive embodiments efficiently handle backup of such fixed length records, as described below in detail.

FIG. 3B shows an example of a flat file 312 that includes a plurality of records (shown as R, R2, R3 ... Rn). The records, R1 to Rn are substantially the same size.

FIG. 3C shows an example of a circular flat file 314 having a fixed number of records R1 to Rn. After the Rn record is stored, application 302 over-writes the previously stored record R1.

The records in circular flat files 314 flat files 312) may change frequently. As described above, conventional systems attempt to incrementally backup only the changed or new records. However, the conventional approach is inefficient because files are backed up on a block by block basis. To determine which block has changed at any given time and then backing up the changed blocks, one has to generate a hash function for each stored and changed block and then compare the generated hash functions. Generating and comparing the hash functions at individual block level consumes computing resources, and hence, is inefficient. The adaptive embodiments disclosed herein alleviate this problem by maintaining a data structure (also referred to as an index file, interchangeably, throughout this specification) 304 (FIG. 3A), as described below.

Application 302 maintains data structure 304 data files. Data structure may be stored at the primary storage 308 or any other storage location accessible to application 302. In one illustrated embodiment, data structure 304 includes a file name and an offset value of a last written record. However, those skilled in the art would understand that there may be other stored parameters in data structure 304. FIG. 3D shows an example of data structure 304 as maintained by application 302. Column 316 of data structure 304 stores a file identifier (for example, a file name) for each file. Column 318 stores an offset value of a last written record each file. The offset value indicates that data is consistent at a given time. By comparing the offset value a given file, one can identify the records that were added since a last backup operation.

Figure 3E:
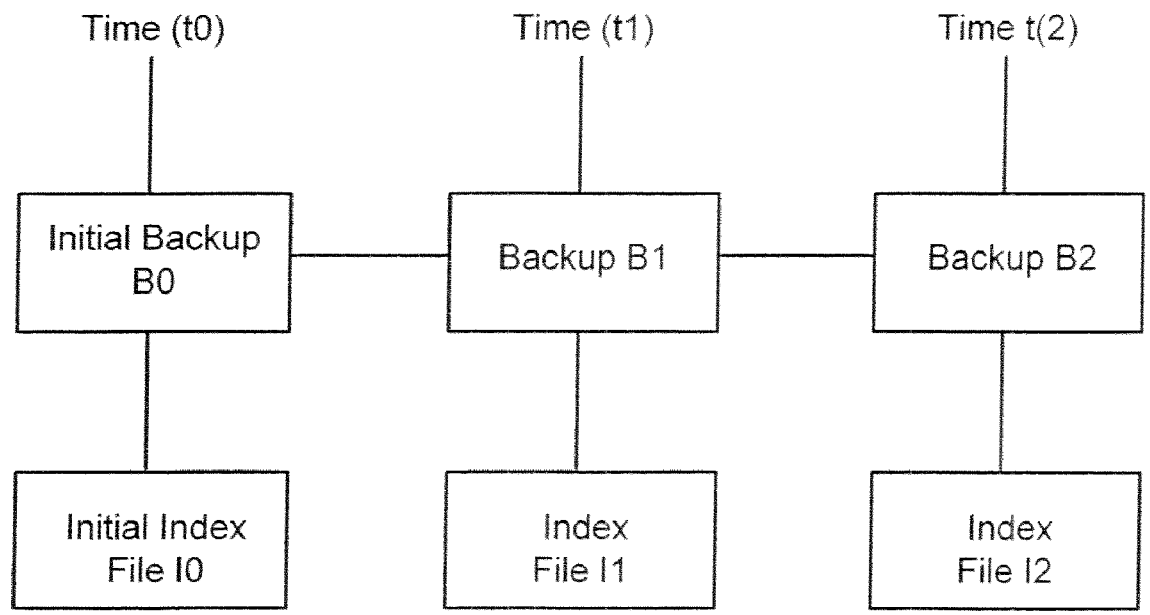
FIG. 3E illustrates the use of the index file of FIG. 3D in incremental backup of stored data, according to one embodiment.

FIG. 3E illustrates the use of data structure 304 for incremental backup, according to one embodiment. The backup application 306 performs an initial back of stored data. This is shown as B0 (may be referred as a "backup container").

Application 302 creates an initial data structure (referred to as index file (I0)) corresponding to the initial backup operation (B0). Application maintains the data structure 304 for all records that are added (or updated) after the initial backup B0.

For a next backup operation (shown as at a given time t1, an updated data structure (shown as index file (I1)) is compared with the initial index file I0. This identifies the records that were added since B0. Backup application 306 backs up only the records that were added (or modified, used interchangeably throughout this specification) since backup operation B0.

The same process takes place for a next backup operation (B2) at time t2 using an updated data structure (shown as index file I2). For backup operation B2, index file I1 becomes the base file and is compared with index file I2. The comparison identifies the new records that were added since backup B1. Backup application 306 backs up records that were added since backup B1.

The incremental backup system is efficient because application 302 has the intelligence to maintain data structure 304. Comparing offset values for individual files is faster than generating/comparing hash functions for each block of stored data.

Figure 4:
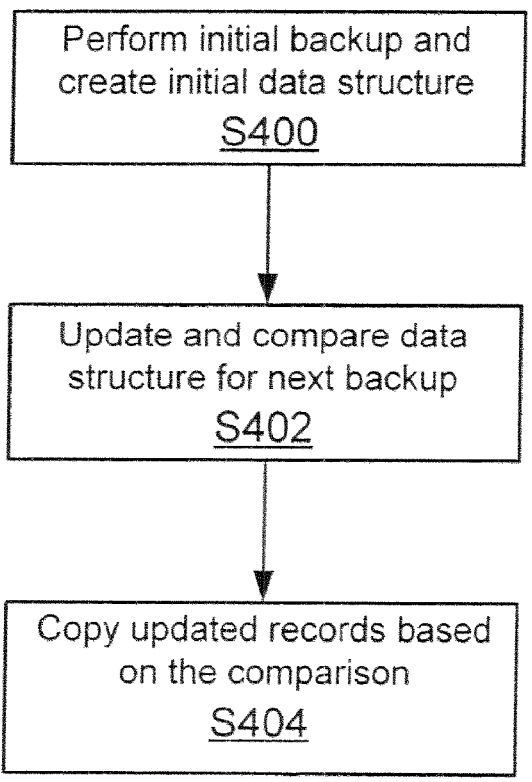
FIG. 4 shows a process flow diagram for incremental backup of stored data, according to one embodiment.

Process Flow:

FIG. 4 shows a process flow diagram for performing incremental backup of stored data, especially for flat files and circular flat files, according one embodiment. For clarity sake, the process steps are described with respect to the aforementioned Figures. However, the process steps may be implemented in different systems.

Referring to FIG. 4, in step S400, an initial backup of stored data is performed at time t0 (for example, backup B0, FIG. 3E). Data structure 304 is also created by application 302 that is described above.

In step S402, for a next backup operation (for example, backup B1, FIG. 3E), an updated data structure at that instance (for example, I1) is compared to the base structure (for example, I0). Based on the comparison, backup application 306 determines which records have been added or modified since the previous backup (for example, the initial backup). In one embodiment, backup application 306 compares the data structures.

In step S404, the added or modified records are copied to secondary storage. This process is repeated for future backups and a previous data structure becomes a base data structure for a next backup operation, as shown in FIG. 3E.

The various embodiments disclosed herein provide advantageous solutions to incremental backup of files with fixed length records. The backup operation occurs without any disruption to any operating application. Because only changed records are copied, the backup files consume less storage space than if all the file records are repeatedly copied and saved.

The solutions provided by the various embodiments are less complex than conventional block level backup techniques that generate complex hash functions to determine if data at a block level has changed. In the present embodiments, the application that creates records also maintains a data structure for new and updated records. Maintaining a data structure is less burdensome than generating complex hash functions and then comparing the hash functions to ascertain which records may have changed.

While the present disclosure is described above with respect to what is currently considered its preferred embodiments, it is to be understood that the disclosure is not limited to that described above. To the contrary, disclosure is intended to cover various modifications and equivalent arrangements within the spirit and scope of the appended claims.

What is claimed is:

1. A method for backing up a plurality of data containers using a processor executable backup application, each data container having a plurality of fixed length records, comprising: creating a first backup data container, during a first backup operation, by copying the plurality of data containers from a first storage device to a second storage device; wherein the backup application creates the first backup container; creating an initial data structure corresponding to the first backup data container for storing a unique file identifier for each of the plurality of data containers and for storing an offset value of a last written record for each of the plurality of data containers; wherein a processor executable application that is different from the backup application generates the plurality of data containers and creates the initial data structure; continuously updating the initial data structure as records are frequently updated or added to the plurality of data containers after the first backup operation; wherein the application that adds or updates the records also directly updates the initial data structure; comparing the updated initial data structure with the initial data structure to identify which records have been added and modified since the first backup operation; wherein the offset value is used to determine if any record was updated or added since the first backup operation; and the backup application compares the updated initial data structure with the initial data structure to ascertain which records were added or modified without performing a block by block comparison; and performing a second backup operation by copying the records that were added and modified since the first backup operation; wherein the backup application performs the second backup application.

2. The method of claim 1, wherein the plurality of data containers include flat files.

3. The method of claim 1, wherein the plurality of data containers include circular flat files.

4. The method of claim 1, wherein the second backup operation for copying the records that were added and modified since the first backup operation is performed without generating hash functions.

5. A method for backing up a plurality of data containers, each data container having a plurality of fixed length records, comprising: creating a first backup data container for the plurality of data containers by copying the plurality of data containers from a first storage device to a second storage device; wherein a processor executable backup application creates the first backup data container during a first backup operation; creating an initial data structure corresponding to the first backup operation for storing a unique file identifier for each of the plurality of data containers and for storing an offset value of a last written record for each of the plurality of data containers; continuously directly updating the initial data structure as records are frequently added and updated in the plurality of data containers; wherein a processor executable application that is different from the backup application writes the fixed length records for the plurality of data containers, creates and updates the initial data structure; comparing the updated data structure with the initial data structure to identify which records have been added and modified since the first backup operation; wherein the offset value is used by the backup application to determine if any record was updated or added since the first backup operation without performing a block by block comparison: and performing a second backup operation by copying the added and the modified records since the first backup operation.

6. The method of claim 5, wherein the plurality of data containers include flat files.

7. The method of claim 5, wherein the plurality of data containers include circular flat files.

8. The method of claim 5, wherein the second backup operation for copying the records that were added and modified since the first backup operation is performed without generating hash functions.

9. A processor executable system, comprising: a processor executable application for creating a plurality of data containers that are stored at a first storage device, where each of the plurality of data containers include a plurality of fixed length records; and a processor executable backup application that is different from the processor executable application, during a first backup operation, creates a first backup data container for the plurality of data containers by copying the plurality of data containers from the first storage device to a second storage device; wherein the application (a) creates an initial data structure for storing a unique file identifier for each of the plurality of data containers and an offset value of a last written record for each of the plurality of data containers; and (b) continuously directly updates the initial data container as records are frequently added and updated to the plurality of data containers after the first backup operation; and wherein the backup application uses the offset value to compare the updated data container with the initial data container to identify which records have been added and modified since the first backup operation without performing a block by block comparison: and the backup application performs a second backup operation by copying the records that were added and modified since the first backup operation.

10. The system of claim 9, wherein a first computing system executes the application and the first computing system is operationally coupled to a storage system storage server.

11. The system of claim 9, wherein the plurality of data containers include flat files.

12. The system of claim 9, wherein the plurality of data containers include circular flat files.

13. The system of claim 9, wherein a storage server executes the backup application.

14. The system of claim 9, wherein the second backup operation for copying the records that were added and modified since the first backup operation is performed without generating hash functions.

15. A computer program product, comprising: a computer usable storage medium having computer readable code embodied therein for backing up a plurality of data containers, each data container having a plurality of fixed length records, said computer readable code includes: code for creating a first backup data container, during a first backup operation, by copying the plurality of data containers from a first storage device to a second storage device; wherein a processor executable backup application creates the first backup container; code for creating an initial data structure corresponding to the first backup data container for storing a unique file identifier for each of the plurality of data containers and for storing an offset value of a last written record for each of the plurality of data containers; wherein a processor executable application that is different from the backup application, generates the plurality of data containers and creates the initial data structure; code for continuously directly updating the initial data structure as records are frequently updated or added to the plurality of data containers after the: first backup operation; wherein the application that adds or updates the records also updates the initial data structure; code for comparing the updated initial data structure with the initial data structure to identify which records have been added and modified since the first backup operation; wherein the offset value is used to determine if any record was updated or added since the first backup operation and the backup application compares the updated initial data structure with the initial data structure to ascertain which records were added or modified without performing a block by block comparison; and code for performing a second backup operation by copying the records that were added and modified since the first backup operation; wherein the backup application performs the second backup application.

16. The computer program product of claim 15, wherein the plurality of data containers include flat files.

17. The computer program product of claim 15, wherein the plurality of data containers include circular flat files.

18. The computer program product of claim 15, wherein the second backup operation for copying the records that were added and modified since the first backup operation is performed without generating hash functions.

* * * * *